March 24, 1970    T. F. JARVIS ET AL    3,502,496

METHOD OF FINISHING PLASTIC ARTICLES

Filed July 20, 1966

INVENTORS.
THOMAS F. JARVIS
CARL W. OSBORNE

BY *Hofgren, Wegner, Allen,*
*Stellman & McCord*
ATTORNEYS

United States Patent Office

3,502,496
Patented Mar. 24, 1970

3,502,496
METHOD OF FINISHING PLASTIC ARTICLES
Thomas F. Jarvis, La Mesa, Calif., and Carl W. Osborne, Moline, Ill., assignors to Montgomery Elevator Company, a corporation of Delaware
Filed July 20, 1966, Ser. No. 566,522
Int. Cl. B44d 1/14, 1/52; B29c 9/00
U.S. Cl. 117—45      11 Claims

ABSTRACT OF THE DISCLOSURE

A method of finishing a transverse face of a plastic article, such as a push button, which includes the steps of forming a removable protective layer on the longitudinal perimetrical surface of the article, with an edge of said layer in the plane of the face and surrounding the latter, coating the entire face with a liquid, settable material which adheres to the face but not to the protective layer, curing the coating in contact with a smooth release surface to provide a hard smooth coating on the face, and breaking the article with the coating thereon from the release surface. If the article is to have a design such as a letter or numeral on the transverse face the design may first be engraved on the face, the engraving filled with a contrasting settable material which contrasts visually with the face, and the face with the design on it may then be finished as above described.

---

The invention has for its main object to provide a simple, effective and inexpensive method for finishing plastic articles such as the push buttons which are used in an elevator control panel.

A further object of this invention is to provide a new method for finishing plastic push buttons which eliminates all machining and polishing operations.

Heretofore, the machining or finishing of push buttons and the like has been a major cost and labor factor in their manufacture. Various unsuccessful attempts have been made to efficiently simplify the finishing operation. For instance, it has been suggested that a strip of adhesive tape be applied about the periphery of the push button prior to applying a protective coating, to eliminate the machining operation, but such tape does not completely adhere to the edges of the button and an irregular surface often results.

The method of this invention comprises engraving a predetermined design in the transverse face of a push button, filling the engraved recess with a settable filler material of a color which contrasts with the remainder of the face of the push button, and coating the longitudinal perimetrical surface of the push button, with a removable peripheral protective layer of a material such as silicon grease with an edge of the layer flush with the transverse face. Any of the grease which gets onto the face of the push button while the perimetrical surface is being coated is wiped off. A few drops of clear, settable coating material such as polyester resin, which adheres to the face of the push button, but not to the protective layer, is applied to said face, after which the push button face is brought into contact with a smooth spreader plate which has a release surface that spreads the coating material evenly over the face. The push button face remains against the release surface until the clear coating cures. With the longitudinal perimetrical surface of the push button greased the coating material adheres only to the face of the push button, and the button breaks away around its edges at the end of the cure period with a perfectly finished surface. No additional machining or clean-up is required.

For best results the engraving should be only about 0.12 inch deep and relatively narrow width (0.31 width preferred), and a preferred filler material is commercial lacquer thinned to a viscosity between 75 and 150 SSU at 100° F.

Other features, objects and advantages of the invention will become apparent from the following detailed description taken in conjunction with the accompanying drawings in which.

Figure 1:
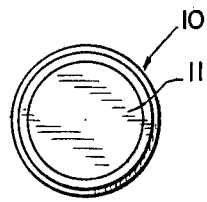
FIG. 1 shows a top plan view of a push button with a plain face.

Referring to the drawings in greater detail, the drawings illustrate the sequence of steps comprising the herein disclosed method of finishing plastic articles having a transverse face with an engraved design. The illustrated article shown in the drawings is a push button, generally indicated 10, having a face 11 with a letter (e.g. the letter "B" for "Basement" in FIG. 2) or numeral formed thereon as would be used in the control panel of an elevator. The particular configuration of the button or the desired design to be engraved and finished thereon is quite immaterial, for the novel method of this invention may be used for a wide range of articles which require an insignia or design on the face which should be protected against marring or scratching.

Figure 2:
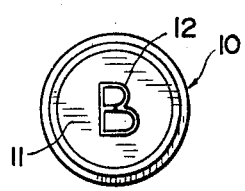
FIG. 2 is a top plan view similar to that of FIG. 1 with a recess in the form of a letter "B" engraved in the face of the push button.
Figure 3:
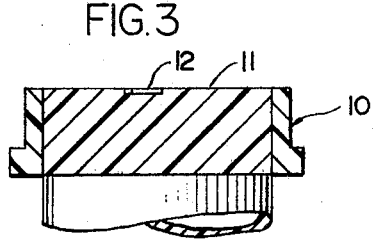
FIG. 3 is a vertical central sectional view on an enlarged scale of the push button of FIG. 2.

The first step of the method of this invention is illustrated in FIGS. 1 through 3 and comprises forming a recess 12 of a predetermined design (e.g. letter "B") in the face of a blank push button (FIG. 1). The recess is formed in a normal manner by using a flat bottomed engraving tool. Such engraved designs have commonly been cut to a depth of about .06 to .07 inch; but that is unsatisfactory in the present method because the filling material for the recess (as hereinafter described) shrinks below the face of the push button as it cures. By cutting only to a depth of approximately .012 inch and a relatively narrow width (i.e., about .031 inch, when the engraved surface is filled, the filling material does not shrink below the surface of the push button as it cures. Merely reducing the depth of the recess reduces the amount of shrink below the surface of the push button, but by also reducing the width of the engraving the shrinkage is practically eliminated and the surface of the cured filling material is substantially coplanar with the face of the push button. It is obvious that the limitation to a narrow width recess is applicable only to "line" design—i.e., designs in which no large areas are cut out.

Figure 4:
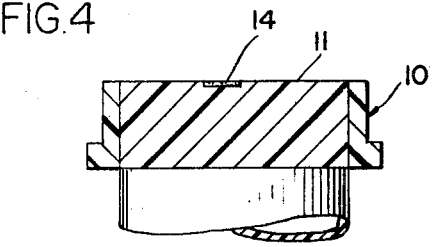
FIG. 4 is a central sectional view similar to that of FIG. 3 with the recess in the face of the push button filled with a settable material.

The recess 12 is then filled with a settable material 14 (FIG. 4) which is preferably a thinned lacquer although a filled polyester resin is also satisfactory. The thinned lacquer has a viscosity of between 75 and 150 SSU at approximately 100° F. Surplus material is scraped from the face of the button with a knife-like tool and the material is allowed to cure to a solid state. Any surplus filler material remaining on the top of a button after it has cured may be removed with solvent such as acetone and a soft cloth.

Figure 5:
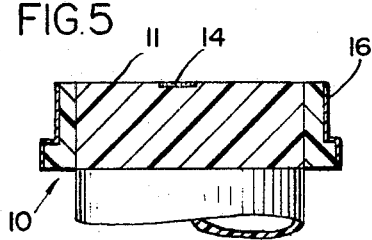
FIG. 5 is a vertical sectional view similar to that of FIG. 4 with a protective layer of grease or the like applied to the longitudinal perimetrical surface of the button.

The longitudinal perimetrical surface of the push button is then coated with a removable protective layer 16 (FIG. 5) of any material to which the surface coating material does not adhere, with an edge of the layer in the plane of the transverse face and surrounding the latter. Silicone grease provides a suitable protective layer if the surface coating is to be polyester resin.

Figure 6:
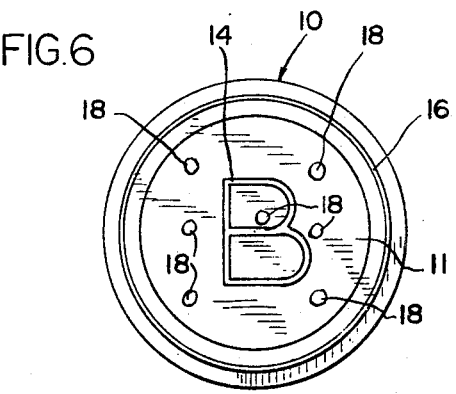
FIG. 6 is a top plan view of the push button of FIG. 5 with at few evenly spaced drops of settable material on the face of the push button.

Several spaced drops 18 of a transparent settable material such as polyester resin are then applied to the face of the push button as seen in FIG. 6. The settable material must be one which adheres firmly to the face 11 of the button and to the filler material 14, but not to the protective layer 16.

Figure 7:
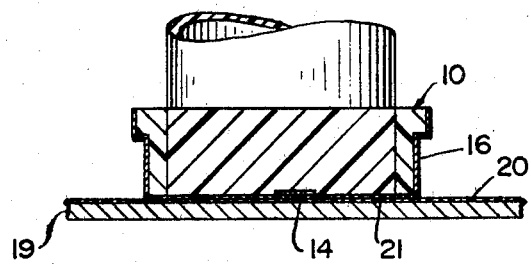
FIG. 7 illustrates the push button inverted on a spreader plate release surface to spread the settable material smoothly over the face and permit the material to cure to a transparent coating.
Figure 8:
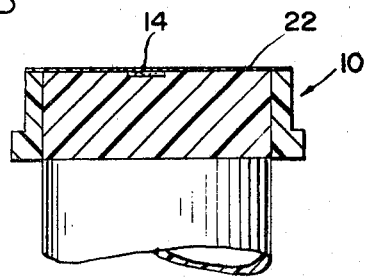
FIG. 8 is a central sectional view of a finished push button with the peripheral protective layer of grease removed therefrom.

The push button with its protective coating surrounding its face and the multiple drops of polyester resin on the face is then brought into contact with a spreader plate 19 which has a release surface 20 to spread the drops into a smooth and even transparent coating 21. Conveniently this is done by inverting the push button on the spreader plate as seen in FIG. 7.

The button remains on the release surface 20 until the transparent coating 21 cures to a solid state and this provides a finished surface 22. A small ring of hardened polyester resin commonly remains around the edge of the push button, but with the grease coating 16, the button breaks away from the release surface at the end of the cure period with a perfectly finished face. No additional machining or clean-up is required.

The type of release surface depends upon the type of finish desired for the face of the push button. Glass or Formica may be used to provide a high gloss, high reflective finish. A fluorinated ethylene polymer such as Du Pont's Teflon produces a highly desirable surface which has a textured look and low reflectivity. In addition, a release surface 20 of Teflon tends to release from the cured coating 22 more cleanly than does glass or Formica, and thus produces a higher percentage of buttons which do not require touch-up around the edges of the coated face. Grease may also be used for a release surface, but if it is there should be only a very small amount of grease in an extremely thin layer.

We claim:
1. The method of finishing a transverse face of a plastic article which comprises the steps of: forming a removable protective layer on the longitudinal perimetrical surface of the article with a edge of the layer in the plane of the face and surrounding the latter; coating the entire face evenly with a transparent, liquid settable material which adheres to the face but not to the surrounding protective layer; permitting said coating to cure in contact with a smooth release surface to provide a hard, smooth, adherent transparent coating on said face; and breaking said article with said coating thereon from said release surface.

2. The method of claim 1 in which the release surface is glass.

3. The method of claim 1 in which the release surface is a fluorinated ethylene polymer.

4. The method of claim 1 in which the protective layer is a grease material and the transparent, settable coating is a polyester resin.

5. The method of claim 1 in which the liquid settable material is applied to the face in spaced drops, and the release surface is on a spreader plate which is brought into contact with the face to spread the settable material evenly over the face.

6. The method of claim 5 in which the article is inverted and set on the spreader plate with said face contacting the release surface.

7. The method of manufacturing a plastic article which has a substantially planar transverse face bearing a predetermined design, said method comprising the steps of: forming said design as a recess in said face; filling said recess with a settable filler material which contrasts visually with the face of the article; allowing said filler material to set to a solid state; forming a removable protective layer on the longitudinal perimetrical surface of the article with an edge of the layer in the plane of the face and surrounding the latter; coating the entire face evenly with a transparent, liquid settable material which adheres to the face but not to the surrounding protective layer; permitting said coating to cure in contact with a smooth release surface to provide a hard, smooth, adherent transparent coating on said face; and breaking said article with said coating thereon from said release surface.

8. The method of claim 7 in which the filler material has a viscosity between 75 and 150 SSU at 100° F.

9. The method of claim 7 in which the recess is formed to a depth of no more than about 0.12 inch.

10. The method of claim 9 in which the design is a line design and the recess is formed to a width of no more than about .031 inch.

11. The method of claim 10 in which the filler material has a viscosity between 75 and 150 SSU at 100° F.

References Cited

UNITED STATES PATENTS

| 2,584,841 | 2/1952 | Caprez et al. | 264—246 |
| 3,139,352 | 6/1964 | Coyner | 117—5.5 |
| 3,341,646 | 9/1967 | Britain | 264—213 |

ALFRED L. LEAVITT, Primary Examiner

M. F. ESPOSITA, Assistant Examiner

U.S. Cl. X.R.

40—136; 117—5.5, 6; 156—247; 264—130, 245, 247, 338